(12) United States Patent  
Al-Omari et al.

(10) Patent No.: US 8,194,983 B2  
(45) Date of Patent: Jun. 5, 2012

(54) METHOD AND SYSTEM FOR PREPROCESSING AN IMAGE FOR OPTICAL CHARACTER RECOGNITION

(76) Inventors: Hussein Khalid Al-Omari, Amman (JO); Mohammad Sulaiman Khorsheed, Riyadh (SA)

(*) Notice: Subject to any disclaimer, the term of this patent is extended or adjusted under 35 U.S.C. 154(b) by 62 days.

(21) Appl. No.: 12/779,152

(22) Filed: May 13, 2010

(65) Prior Publication Data

US 2011/0280477 A1    Nov. 17, 2011

(51) Int. Cl.
- G06K 9/48    (2006.01)
- G06K 9/00    (2006.01)
- G06K 9/18    (2006.01)
- G06K 9/32    (2006.01)

(52) U.S. Cl. ........ 382/198; 382/171; 382/186; 382/187; 382/188; 382/189; 382/301

(58) Field of Classification Search .................. 382/171, 382/198, 296, 301, 186–189
See application file for complete search history.

(56) References Cited

U.S. PATENT DOCUMENTS

| | | | | |
|---|---|---|---|---|
| 5,539,841 A | * | 7/1996 | Huttenlocher et al. | 382/218 |
| 5,889,884 A | * | 3/1999 | Hashimoto et al. | 382/168 |
| 6,005,976 A | * | 12/1999 | Naoi et al. | 382/202 |
| 6,178,263 B1 | * | 1/2001 | Fan et al. | 382/198 |

OTHER PUBLICATIONS

AlKhateeb et al., "Component-based segmentation of words from handwritten Arabic text," Proceedings of World Academy of Science, Engineering and Technology, vol. 31, Jul. 2008.*

Al-Qahtani et al., "Recognizing curxive Arabic script using Hidden Markov Models," published online Aug. 2008 as shown on record.*

Konidaris et al., "Keyword-guided word spotting in historical printed documents using synthetic data and user feedback," IJDAR (2007) 9:167-177.*

Al-A'ali et al., "Optical Character Recognition system for Arabic text using cursive multi-directional approach," Journal of Computer Science 3 (7): 549-555, 2007.*

Ball et al., "Segmentation-based and segmentation-free methods for spotting handwritten Arabic words," Proc. Int. Workshop on Frontiers of Handwriting, Oct. 2006, pp. 53-59, La Baule, France.*

Farooq et al., "Pre-processing methods for handwritten Arabic documents," ICDAR'05, 2005.*

Shaikh et al., "Segmentation of Arabic text into characters for recognition," IMTIC 2008, CCIS 20, pp. 11-18, 2008.*

Zaghloul et al., "Arabic CWR based on correlation of normalized signatures of words images".*

* cited by examiner

*Primary Examiner* — Anand Bhatnagar  
*Assistant Examiner* — Soo Park

(57) ABSTRACT

The present invention provides method and system for preprocessing an image including one or more of Arabic text and non-text items for Optical Character Recognition (OCR). The method includes determining a plurality of components associated with one or more of the Arabic text and the non-text items, wherein a component includes a set of connected pixels. A first set of characteristic parameters is then calculated for the plurality of components. The plurality of components are subsequently merged based on the first set of characteristic parameters to form one or more of one or more subwords and one or more words.

20 Claims, 14 Drawing Sheets

METHOD AND SYSTEM FOR PREPROCESSING AN IMAGE FOR OPTICAL CHARACTER RECOGNITION

FIELD OF THE INVENTION

The invention generally relates to preprocessing an image for Optical Character Recognition (OCR), and more specifically, to a method and system for preprocessing an image comprising Arabic text and non-text items.

BACKGROUND OF THE INVENTION

Automatic conversion of scanned documents into editable and searchable text requires the use of accurate and robust Optical Character Recognition (OCR) systems. OCR systems for English text have reached a high level of accuracy due to various reasons. One of the main reasons is the ability to preprocess English text down to isolated characters to provide as input to the OCR systems. Each character of English text can be isolated because of the non-touching nature of printed English text. However, touching scanned characters present a challenge to the OCR systems and reduce their accuracy when the pitch is variable.

Arabic scanned text includes a series of touching characters and is therefore harder to segment into characters. Another difficulty is that Arabic text may include many dots and accent marks placed above or below the letters to indicate the pronunciation of the letter and the vowel that follows it. This inhibits known preprocessing techniques designed for English from accurately processing Arabic text.

A further characteristic of Arabic text is that the Arabic text can be written with or without the accent marks that indicate the vowels. Additionally, while English text can have either an uppercase representation or a lowercase representation, many Arabic letters include three or four shapes depending on whether they are placed at the beginning of a word, at the middle of the word, at the end of the word, or as a standalone word. Therefore, the various combinations possible with Arabic text due to the accent marks and the location of a letter within a word makes preprocessing Arabic text with present OCR preprocessing systems inaccurate.

Therefore, there is a need for a method and system to consider the above characteristics of Arabic text to preprocess an image comprising Arabic text and non-text items for OCR.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 10 depicts an image with the non-text items filtered in accordance with an exemplary embodiment of the invention.

FIG. 11 illustrates two horizontal lines segmented together in accordance with an exemplary embodiment of the invention.

FIG. 12 illustrates the two horizontal lines separated based on one or more of the line height and the line spacing in accordance with an exemplary embodiment of the invention.

Figure 1:
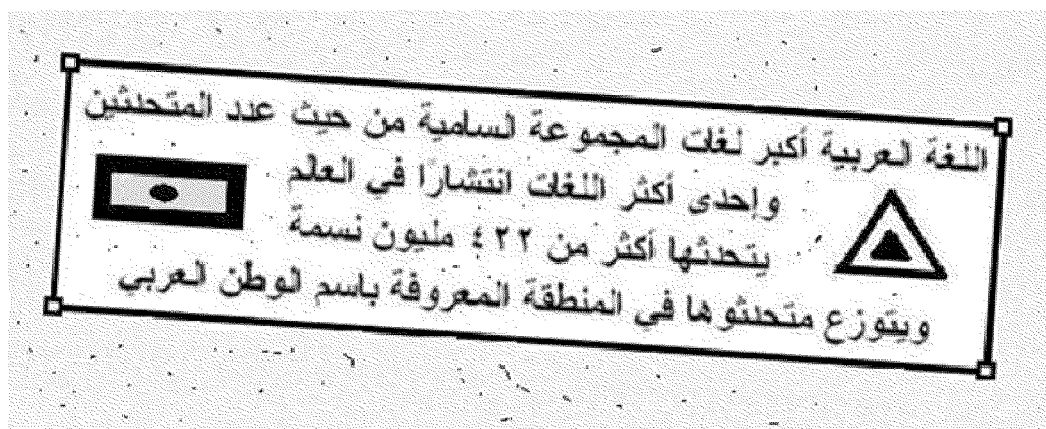
FIG. 1 illustrates an exemplary representation of an image including Arabic text and non-text items in accordance with various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to a method and system for preprocessing an image including Arabic text and non-text items for optical character recognition (OCR). Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional transaction-clients and unique stored program instructions that control the one or more transaction-clients to implement, in conjunction with certain non-transaction-client circuits, some, most, or all of the functions of a method for preprocessing an image including Arabic text and non-text items for OCR. The non-transaction-client circuits may include, but are not limited to, a radio receiver, a radio transmitter, signal drivers, clock circuits, power source circuits, and user input devices. As such, these functions may be interpreted as steps of methods for preprocessing an image including Arabic text and non-text items for OCR. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to various embodiments, the invention provides a method and system for preprocessing an image for OCR, wherein the image includes Arabic text and non-text items. The method includes determining a plurality of components associated with one or more of the Arabic text and the non-text items, wherein a component includes a set of connected pixels. A first set of characteristic parameters associated with the plurality of components are then calculated. The plurality of components are subsequently merged based on the first set of characteristic parameters to form one or more of one or more sub-words and one or more words.

FIG. 1 illustrates an exemplary representation of an image including Arabic text and non-text items in accordance with various embodiments of the invention. The image includes a single column of one or more of Arabic text and non-text items. The image may be one of a grayscale image and a color image. Additionally, the image may include salt and pepper noise and also may be skewed. Prior to preprocessing the image for OCR, the image is converted into a binary image. In an instance when the image is a grayscale image, the image is converted to binary by converting each pixel value between 0 and 255 to either a pixel value 0 or a pixel value 1. In an embodiment, the pixel value 0 represents a background value and the pixel value 1 represents a foreground value. Alternatively, the pixel value 0 may represent the foreground value and the pixel value 1 may represent the background value. The pixel value 0 is associated with a white pixel and the pixel value 1 is associated with a black pixel.

Before converting a pixel value of a pixel, a threshold value is determined for the grayscale image and accordingly pixel values that lie above the threshold value are converted into a pixel value 1 and pixel values that lie below the threshold value are converted into a pixel value 0. In an embodiment, the threshold value is calculated by creating a histogram of the pixel values of the grayscale image. The histogram represents a frequency of each pixel value. On creating the histogram, a smoothened histogram may be generated by adding frequencies of consecutive pixel values and replacing the consecutive pixel values with a single pixel value having combined frequency of the consecutive pixel values. The number of consecutive pixel values considered may be predefined. Subsequently, the two most dominant peaks of the smoothened histogram are selected and a minimum valley between the two dominant peaks is determined. A pixel value having minimum frequency in the minimum valley is then selected as the threshold value.

In another instance, when the image is a color image, the color image is first converted to a grayscale image and subsequently to binary as described earlier. In an embodiment, National Television System Committee (NTSC) default values may be used to convert the color image to a grayscale image.

On converting the image into binary, the number of occurrences of the pixel value 0 and the pixel value 1 is counted. The binary value having a lower count is considered the foreground value and the binary value having a higher count is considered the background value. In other words, the foreground value and the background value are calculated to decide if the image is correct video i.e. black text on white background or reverse video i.e. white text on black background. Alternatively, the foreground value and the background value may be predefined if dynamic calculation of the foreground value and the background value is not preferred.

Further, the salt and pepper noise as well as the skew associated with the image are removed prior to preprocessing the image for OCR. The salt and pepper noise represents randomly occurring white and black pixels and may include light spots on a dark background or dark spots on a light background. In an embodiment, the salt and pepper noise may be removed by using one or more of a median filter and a majority filter. It will be apparent to a person skilled in the art that the salt and pepper noise may also be removed using one or more noise removal techniques known in the art.

Figure 2:
FIG. 2 illustrates the image after converting one of the grayscale and the color image into binary, removal of salt and pepper noise and correction of skew in accordance with an embodiment of the invention.

On removing the salt and pepper noise, the skew associated with the image is corrected by determining a baseline associated with the image and orienting the image based on the alignment of the baseline. The alignment of the baseline is determined by a modified Hough transform wherein horizontal projections are determined in several directions. The horizontal projections indicate a number of pixels associated with the foreground of the image. A reasonable run length corresponding to an approximate word length in Arabic is considered to determine a direction having a highest density of pixels. The direction of the highest density of pixels is considered as the alignment of the baseline. Subsequently, the image is oriented based on the alignment of the baseline. FIG. 2 illustrates the image after converting one of the grayscale and the color image into binary, removal of salt and pepper noise and correction of skew.

Figure 3:
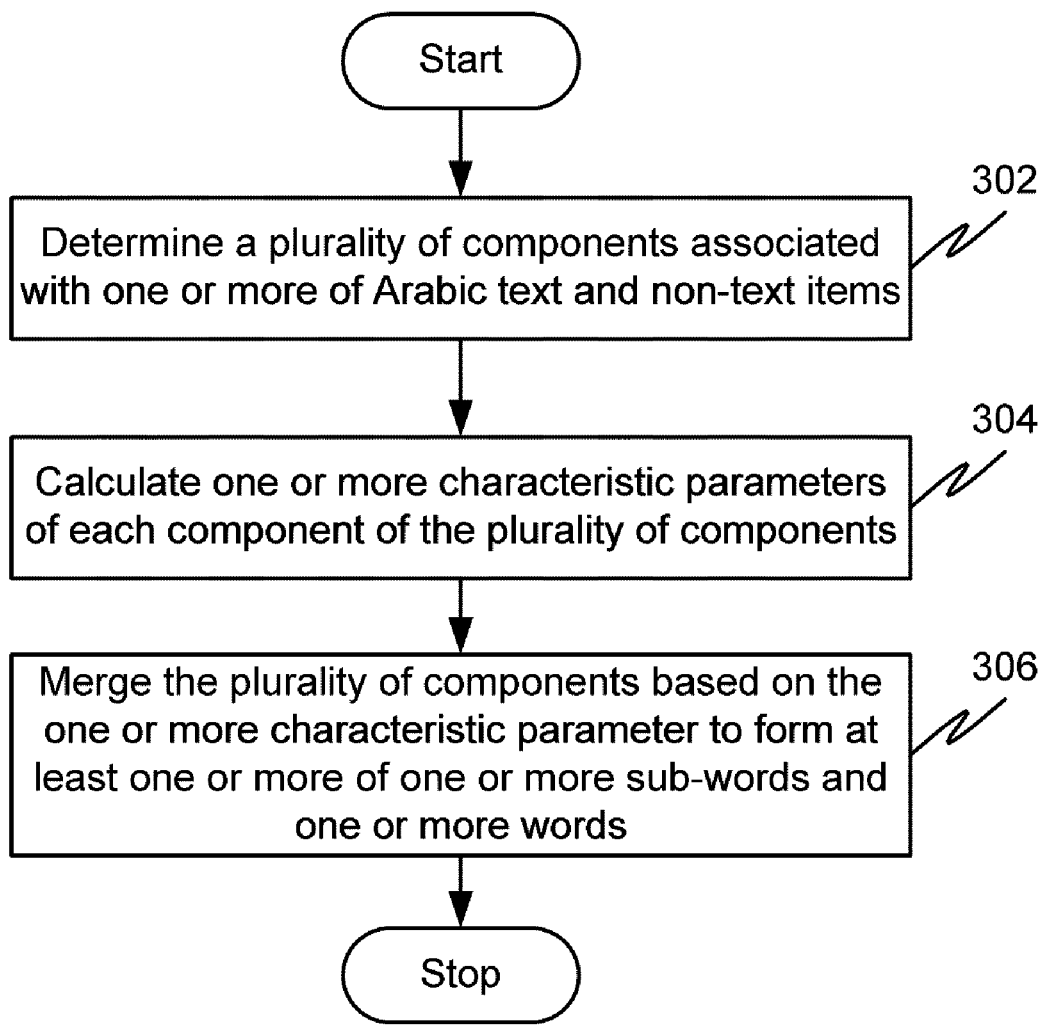
FIG. 3 illustrates a flow diagram of a method of preprocessing an image including Arabic text and non-text items for optical character recognition in accordance with an embodiment of the invention.

Turning now to FIG. 3, a flow diagram of a method of preprocessing an image including Arabic text and non-text items for optical character recognition is illustrated in accordance with an embodiment of the invention. As described earlier, the image is obtained by performing one or more of converting the image to binary, removing salt and pepper noise, and correcting skew associated with the image. Now, in order to preprocess the image, a plurality of components associated with one or more of the Arabic text and the non-text items in the image are determined at step 302. A component includes a set of connected pixels. A component represents a single character of the Arabic text when the character does not touch any other characters. Accordingly, when more than one character touches each other, then the touching characters are considered one component. The method of determining the plurality of components is further explained in conjunction with FIG. 4.

On determining the plurality of components, a first set of characteristic parameters are calculated for the plurality of components at step 304. In an embodiment, the first set of characteristic parameters includes a line height, a word spacing, a line spacing, a number of pixels of each component, a width of each component, a height of each component, coordinates of each component, density of each component, and aspect ratio of each component.

One or more of the line height, the word spacing, and the line spacing is calculated based on an average value of all the components of the plurality of components of the image. The line height is the frequently occurring height averaged over all the components of the plurality of components. The word spacing is the frequently occurring space between any two consecutive components averaged over the plurality of components. Similarly, the line spacing is the frequently occurring spacing between two lines of the Arabic text averaged over all the lines of the image. The methods involved in calculating the line height, the word spacing, and the line spacing are further explained in conjunction with FIG. 5, FIG. 6, and FIG. 7 respectively.

Additionally, the number of pixels of a component, the width of a component, the height of a component, the coordinates of a component, the density of a component, and the aspect ratio of a component are calculated for each component of the plurality of components.

Thereafter, at step 306, the plurality of components are merged based on the first set of characteristic parameters to form one or more of one or more sub-words and one or more words. The method of merging the plurality of components is further explained in conjunction with FIG. 8.

Figure 4:
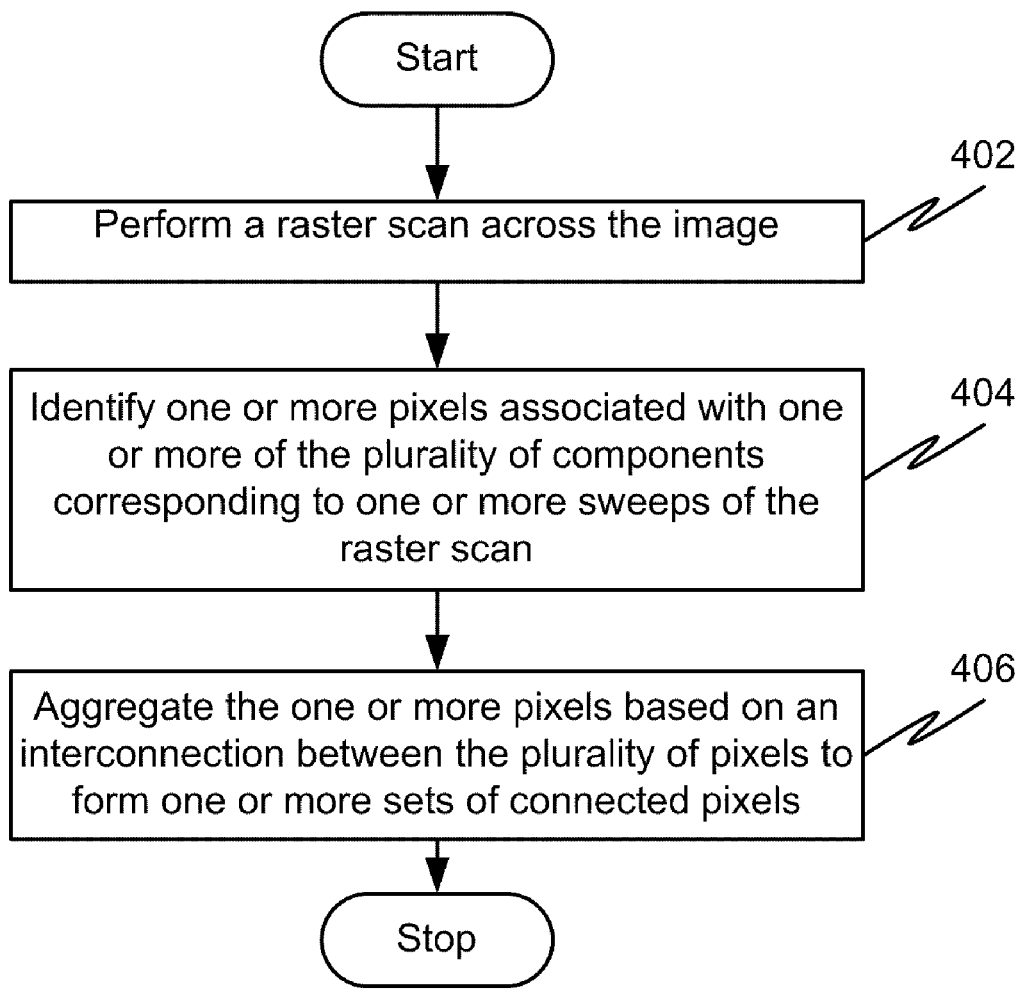
FIG. 4 illustrates a flow diagram of a method of determining a plurality of components in accordance with an embodiment of the invention.

FIG. 4 illustrates a flow diagram of a method of determining a plurality of components in accordance with an embodiment of the invention. At step 402, a raster scan is performed across the image. The raster scan performs a plurality of sweeps, one sweep for each row of pixels corresponding to the plurality of components. In response to performing one or more sweeps of the raster scan, one or more pixels associated with the foreground of the image are identified at step 404. The foreground of the image corresponds to the plurality of components. Subsequently, at step 406, a plurality of pixels are aggregated based on an interconnection between the plurality of pixels to form one or more sets of connected pixels. In an embodiment, the plurality of pixels are considered to be interconnected when they touch one or more of eight neighboring pixels. Thus, consecutive characters in Arabic text form a single component when one or more pixels associated with the consecutive characters are interconnected to each other.

For example, a pixel identified in a current sweep of the raster scan is aggregated with a pixel identified in a previous sweep when the two pixels touch each other. When the pixel identified in the current sweep touches more than one pixel identified in the previous sweep, then the pixel is aggregated with the more than one pixels. In another case, when more than one pixels identified in the current sweep are touching, then the more than one pixels are aggregated. Similarly, one or more pixels identified in subsequent sweeps of the raster scan are also aggregated when the one or more pixels touch each other. The aggregated pixels form a set of connected pixels and are associated with a component of the plurality of components.

On determining the set of connected pixels, one or more of the number of pixels of each component, the width of each component, the height of each component, the coordinates of each component, the density of each component, and the aspect ratio of each component are also calculated.

Figure 5:
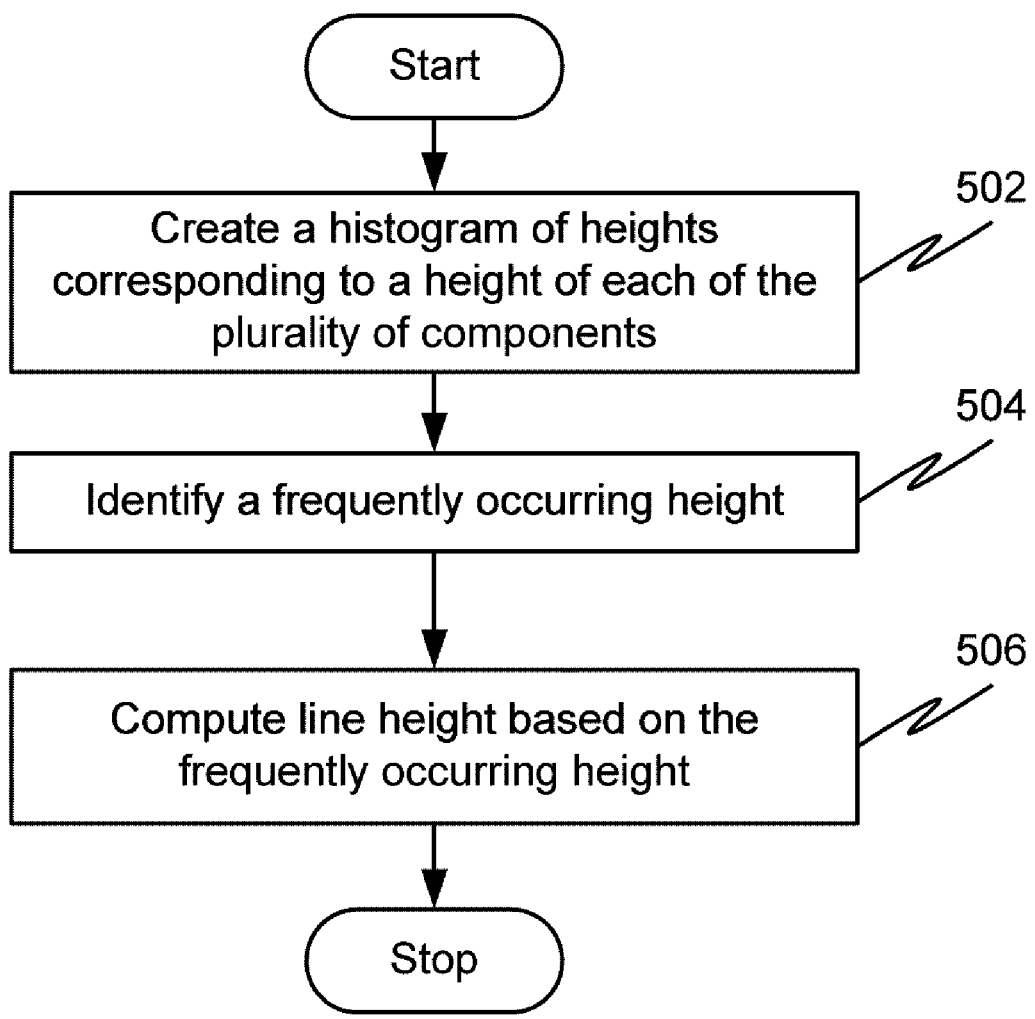
FIG. 5 illustrates a flow diagram of a method of calculating a line height in accordance with an embodiment of the invention.

Turning now to FIG. 5, a flow diagram of a method of calculating a line height is illustrated in accordance with an embodiment of the invention. The method includes creating a histogram of heights corresponding to a height of each of the plurality of components at step 502. The histogram represents the frequency of occurrence of the height of each of the plurality of components. On creating the histogram, a smoothened histogram may be generated by adding the frequencies of consecutive height values and replacing the consecutive height values with a single height value having combined frequency of the consecutive height values. The number of consecutive height values considered may be predefined. For example, the frequency at height twenty pixels becomes that at height nineteen pixels plus that at height twenty pixels plus that at height twenty one pixels if the number of consecutive height values is defined as three.

Once the smoothened histogram is obtained, a frequently occurring height is identified at step 504. For identifying the frequently occurring height, the heights of small components such as accent marks corresponding to the Arabic text and punctuation marks are excluded. This is done by setting a threshold height and only considering the components having a height greater than the threshold height to identify the frequently occurring height. The frequently occurring height represents the dominant text size of the image when the image has more than one text size.

On identifying the frequently occurring height, the line height is computed based on the frequently occurring height at step 506. The line height is computed as a product of the frequently occurring height and a multiplying factor. The multiplying factor depends on the frequently occurring height. The line height may be used to segment one or more of one or more words and one or more sub-words into one or more horizontal lines of the Arabic text. Additionally, the line height is used to calculate the word spacing as explained in conjunction with FIG. 6.

Figure 6:
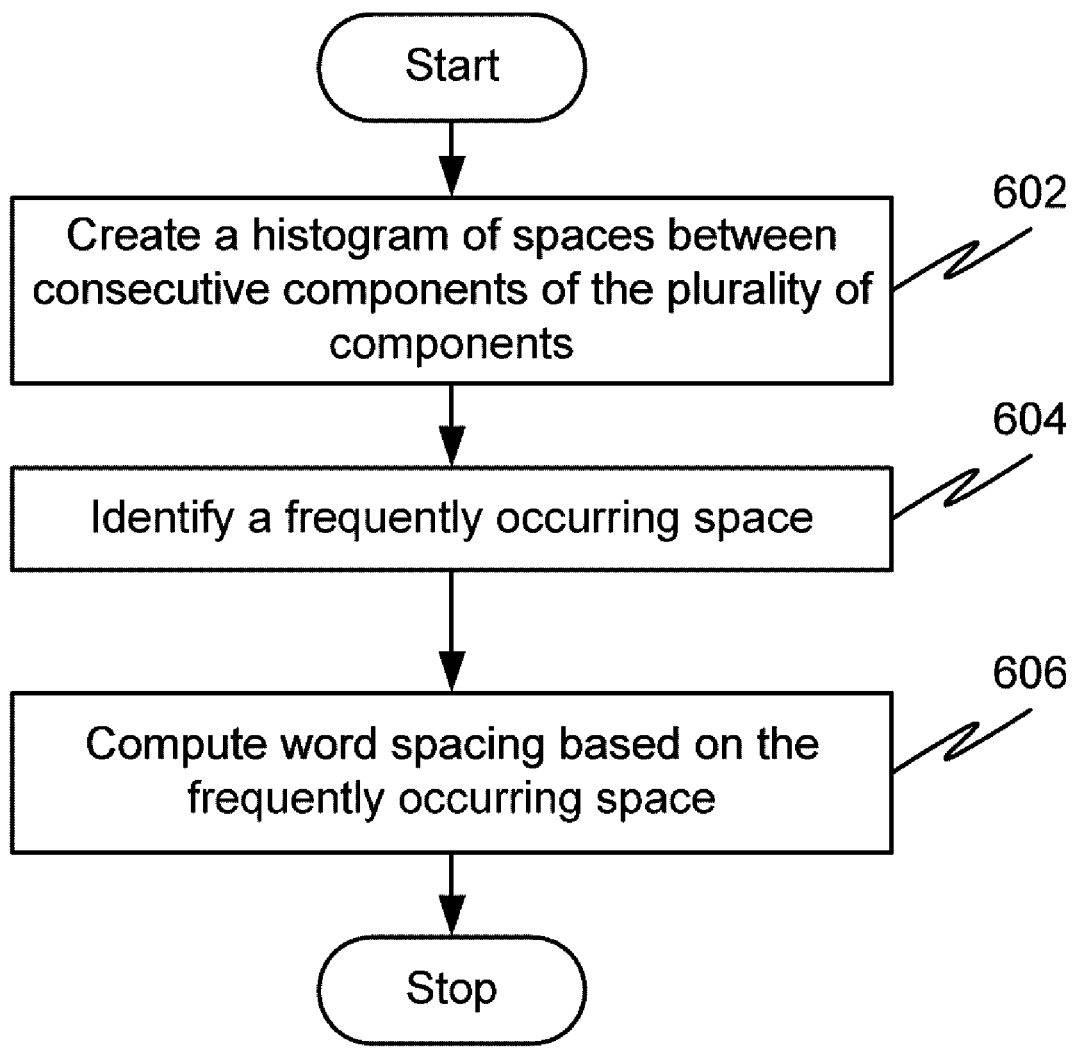
FIG. 6 illustrates a flow diagram of a method of calculating a word spacing in accordance with an embodiment of the invention.

FIG. 6 illustrates a flow diagram of a method of calculating a word spacing in accordance with an embodiment of the invention. The method includes creating a histogram of spaces between consecutive components of the plurality of components at step 602. In an embodiment, any two components that overlap vertically and are not separated by other components are considered to be consecutive components. The two components overlap vertically when the two components share one or more common coordinates along a vertical axis. In other words, the consecutive components belong to a line of the Arabic text. Alternatively, when the two components do not overlap vertically, the two components are considered consecutive components when the two components are separated by a predefined distance.

On creating the histogram of spaces between consecutive components, a smoothened histogram may be generated by adding the frequencies of consecutive space values. The consecutive space values are then replaced by a single space value having the combined frequency of the consecutive space values. For example, the frequency at a space value of ten pixels is replaced by the sum of the frequencies at the space value of nine pixels, the space value of ten pixels, and the space value of eleven pixels.

At step 604, a frequently occurring space from the smoothened histogram is identified. The frequently occurring space is identified from within a threshold range determined by the line height. For example, the frequently occurring space value lying between one fifth the line height and half the line height may be considered. At step 606, the word spacing is computed based on the frequently occurring space. The word spacing is the spacing between two consecutive words of the Arabic text.

Figure 7:
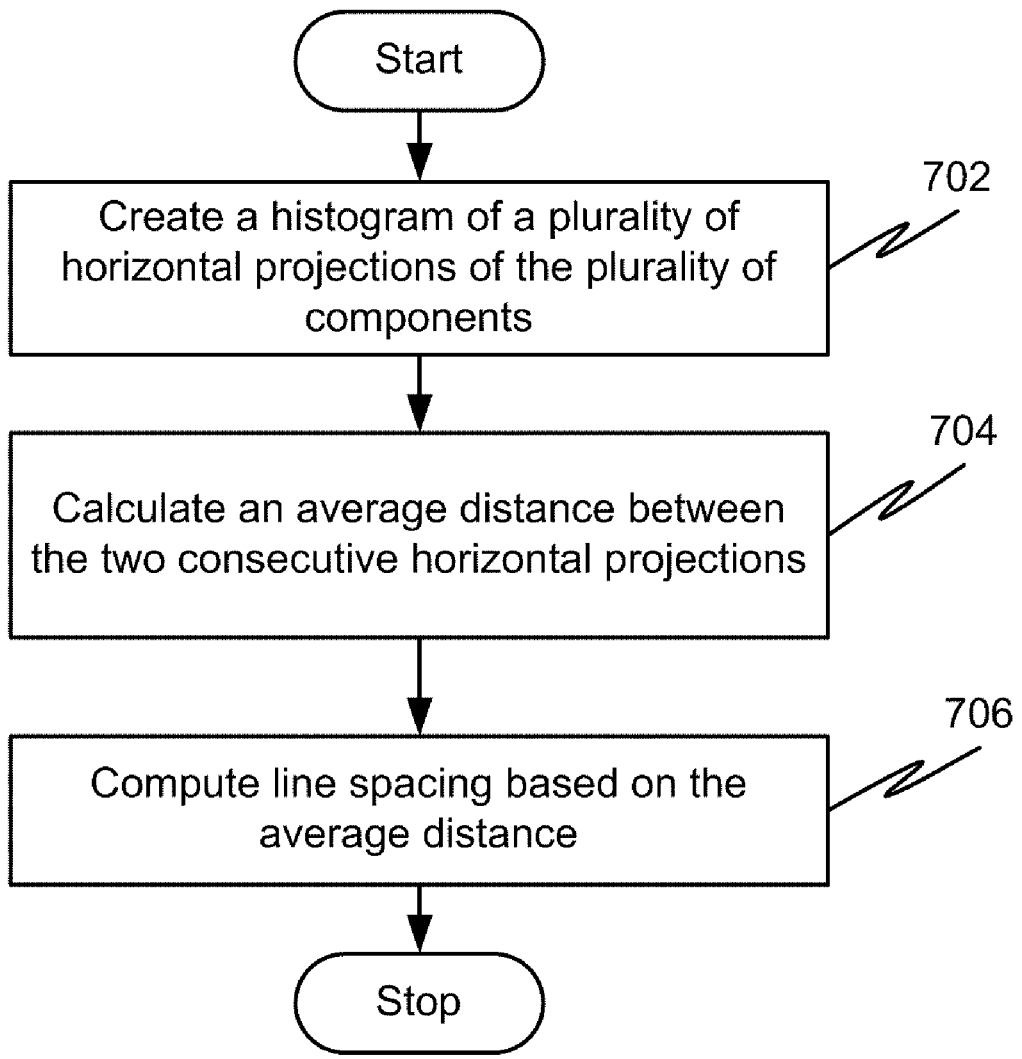
FIG. 7 illustrates a flow diagram of a method of calculating a line spacing in accordance with an embodiment of the invention.

FIG. 7 illustrates a flow diagram of a method of calculating a line spacing in accordance with an embodiment of the invention. At step 702, a histogram of a plurality of horizontal projections of the plurality of components corresponding to the foreground is created. A horizontal projection indicates a number of pixels associated with the plurality of components corresponding to a sweep of the raster scan. For example, when a sweep of the raster scan identifies 15 pixels associated with the plurality of components, then the horizontal projection for the row of pixels corresponding to that sweep is 15.

Thereafter, at step 704, an average distance between two consecutive maximum horizontal projections is calculated. The maximum horizontal projections represent the regions of highest density. Subsequently, at step 706, the line spacing is computed based on the average distance.

Figure 8:
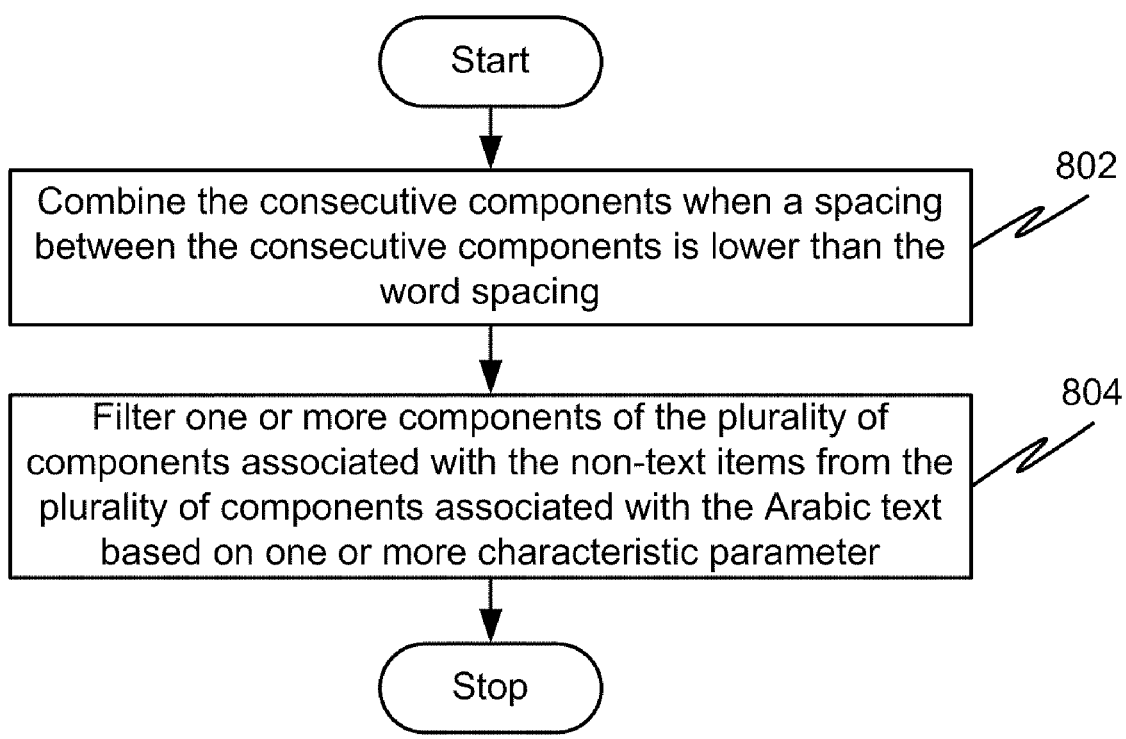
FIG. 8 illustrates a flow diagram of a method of merging the plurality of components in accordance with an embodiment of the invention.

On calculating the first set of characteristic parameters, the plurality of components are merged to form one or more of one or more sub-words and one or more words as explained in conjunction with FIG. 8.

FIG. 8 illustrates a method of merging the plurality of components to form one or more of one or more sub-words and one or more words in accordance with an embodiment of the invention. At step 802, the consecutive components are combined when a spacing between the consecutive components is less than a factor of the word spacing. In addition to the word spacing, the coordinates of the consecutive components may also determine when the consecutive components are combined. Combining the consecutive components based on one or more of the word spacing and the coordinates of the consecutive components causes different components corresponding to a word or a sub-word of the Arabic text to be combined.

For example, the components associated with the accent marks are combined with the words they belong to based on the word spacing and the position of the components. A word may include one or more components. The position of the components is determined from the coordinates of the components. When one or more of the first set of characteristic parameters associated with a component is similar to an Arabic punctuation or accent mark and is at an appropriate proximity with respect to the components corresponding to the letters of the Arabic text, then the component is grouped along with the letters to form a word or a sub-word. Else, the component is considered as noise and is removed.

Figure 9:
FIG. 9 depicts an image with the components associated with the Arabic text and the components associated with the non-text items combined in accordance with an exemplary embodiment of the invention.

In addition to combining the components associated with the Arabic text, the components associated with the non-text items are also combined based on the word spacing. FIG. 9 depicts an image with the components associated with the Arabic text and the components associated with the non-text items combined in accordance with an exemplary embodiment of the invention. Here, the components associated with the non-text items are combined to form one or more larger components.

At step 804, the components associated with the non-text items are filtered from the components associated with the Arabic text based on the first set of characteristic parameters. For example, components having a large height, a large width and a small density are removed. These components may correspond to frames or borders around a column or around other non-text items, wherein the column includes one or more of the Arabic text and the non-text items. Similarly, components with a large height, small width, and a high density are recognized as vertical lines and are removed. Horizontal lines are recognized as having small height, large width, and high density.

Similarly, other non-text items are removed based on one or more filters. The one or more filters use the commonly occurring length of the components, the width of the components, the aspect ratio of the components, the density of the components, and the total number of components of the image to filter the non-text items from the Arabic text. FIG. 10 illustrates the image with the non-text items filtered.

After filtering the non-text items from the Arabic text, a second set of characteristic parameters of the one or more words and one or more sub-words is calculated. The second set of characteristic parameters includes a line height, a word spacing, and a line spacing. The sub-words are then grouped based on one or more of the line height, the word spacing, and the line spacing to form one or more of one or more sub-words and one or more words.

On forming the one or more sub-words and the one or more words, the one or more sub-words and the one or more words that overlap vertically are segmented to form a horizontal line of the Arabic text. In an embodiment, the one or more sub-words and the one or more words may also be segmented based on one or more of the line height and the line spacing. For example, if two horizontal lines are segmented together as they have one or more vertically overlapping components with respect to each other as illustrated in FIG. 11, then the two horizontal lines are separated based on one or more of the line height and the line spacing. This separation is illustrated in FIG. 12.

Figure 13:
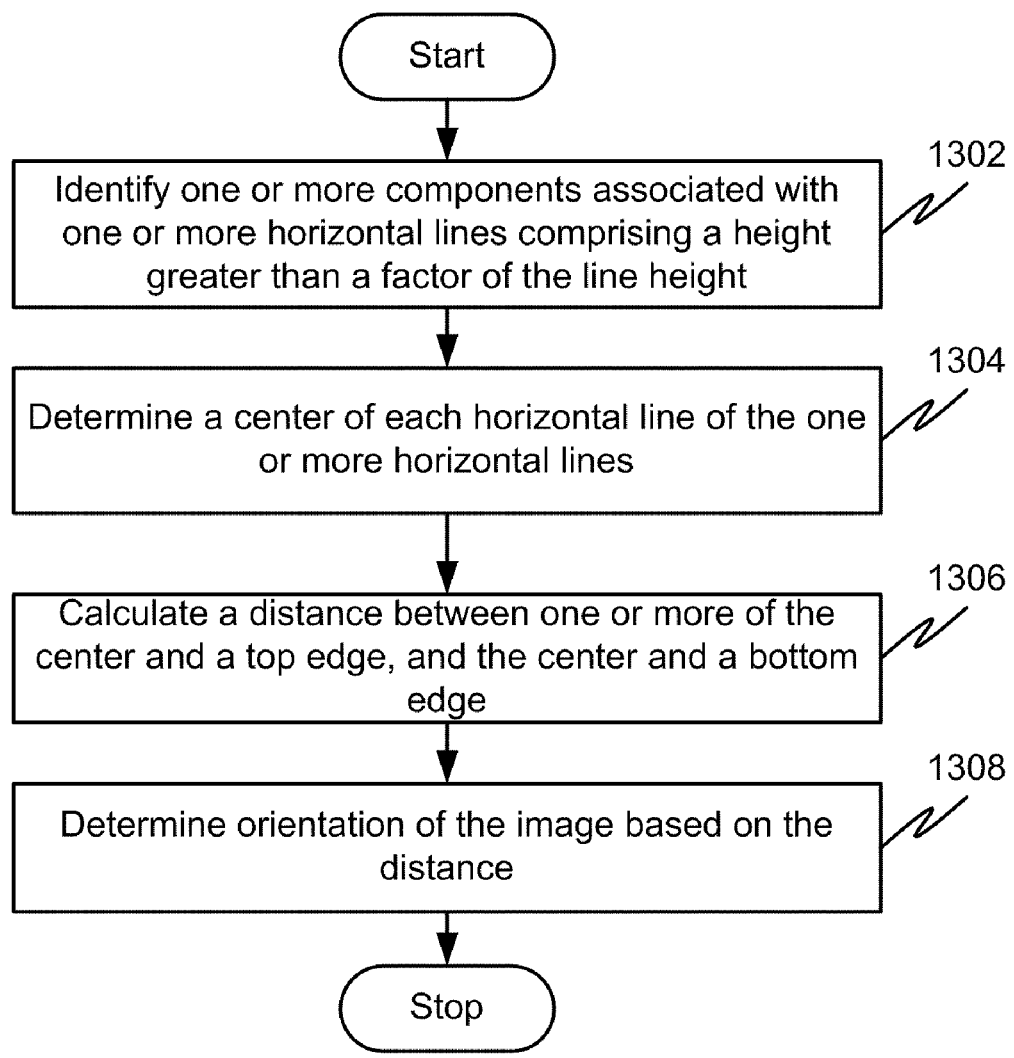
FIG. 13 illustrates a flowchart of a method of determining orientation of the image in accordance with an embodiment of the invention.

On segmenting the one or more of one or more sub-words and one or more words into one of more lines and prior to performing OCR, the orientation of the image is determined. FIG. 13 illustrates a flowchart of a method of determining orientation of the image. The orientation of the image may be one of a right side up image and an upside down image. To determine the orientation, the components having a height greater than a factor of the line height are identified at step 1302. For example, all components having a height more than half the line height may be identified. This is done to exclude the components that are associated with the accent marks and the punctuation marks. Subsequently, a center of each line is determined as the mid point between the top edge and the bottom edges of the line at step 1304. Here, the top edge and the bottom edge are associated with the top and the bottom of the one or more components associated with a horizontal line. At step 1306, a distance is calculated between one or more of the center and the top edge, and the center and the bottom edge. The distance between the center and the top edge is calculated by adding up the absolute values of the distances between the top of each of the identified components in the line and the center. Similarly, the absolute values of the distances between the bottom of each of the identified components in the line and the center line are added up to give the distance between the center and the bottom edge. This is performed for each line of text in the image and an average sum for all the lines is calculated. At step 1308, the orientation of the image is determined. When the average sum of the absolute values above the center is greater than those below the center then the image is determined to be a right side up image. However, when the sum of the absolute values above the center is lower than those below the center, then the image is determined to be an upside down image. In this case, the image is rotated by 180 degrees to convert the upside down image to a right side up image.

Thus, a method of preprocessing an image for OCR, wherein the image includes Arabic text and non-text items is disclosed. The method includes determining a plurality of components associated with the Arabic text and the non-text items. A component of the plurality of components represents one or more characters of the Arabic text or one or more of the non-text items. A component represents more than one character when the more than one character is interconnected.

On determining the plurality of components, a first set of characteristic parameters associated with the plurality of components are calculated. The plurality of components are subsequently merged based on the first set of characteristic parameters to form one or more of one or more sub-words and one or more words.

The method disclosed herein enables accurately preprocessing and segmenting the Arabic text which includes touching characters. The method also takes into consideration the accent marks and punctuation marks associated with the Arabic text when determining if a component is noise or part of the Arabic text.

Figure 14:
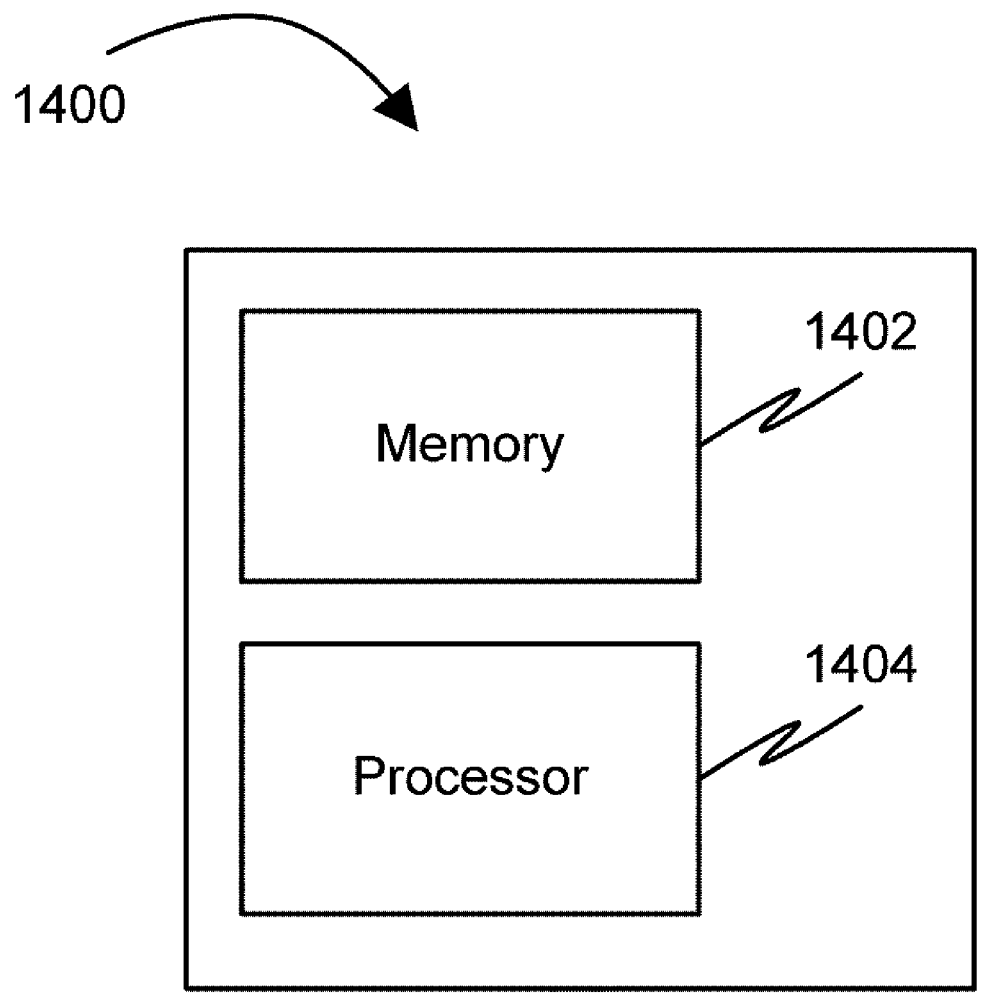
FIG. 14 illustrates a block diagram of a system for preprocessing an image for optical character recognition in accordance with an embodiment of the invention.

FIG. 14 illustrates a block diagram of a system 1400 for preprocessing an image including one or more of Arabic text and non-text items for Optical Character Recognition (OCR) in accordance with an embodiment of the invention. The image includes a single column of one or more of Arabic text and non-text items. The image may be one of a grayscale image and a color image. Additionally, the image may include salt and pepper noise and also may be skewed. As shown in FIG. 14, system 1400 includes a memory 1402 and a processor 1404 coupled to memory 1402. Prior to preprocessing the image for OCR, processor 1404 converts the image into a binary image. Subsequently, processor 1404 removes the salt and pepper noise associated with image. In an embodiment, the salt and pepper noise may be removed by using one or more of a median filter and a majority filter. Thereafter, the skew associated with the image is corrected by the processor 1404 using a modified Hough transform. Now, in order to preprocess the image, processor 1404 determines a plurality of components associated with one or more of the Arabic text and the non-text items. A component includes a set of connected pixels. A component represents a single character of the Arabic text when the character does not touch any other characters. Accordingly, when more than one character touches each other, then the touching characters are considered one component.

In an embodiment, in order to determine the plurality of components, processor 1404 performs a raster scan across the image. The raster scan includes performing a plurality of sweeps, one sweep for each row of pixels corresponding to the plurality of components. In response to performing one or more sweeps of the raster scan, one or more pixels associated with the foreground of the image are identified. The foreground of the image corresponds to the plurality of components. Subsequently, processor 1404 aggregates a plurality of pixels based on an interconnection between the plurality of pixels to form one or more sets of connected pixels. The aggregated pixels form a set of connected pixels and are associated with a component of the plurality of components.

The plurality of components thus determined by processor 1404 may be stored in memory 1402 and are used by processor 1404 to calculate a first set of characteristic parameters associated with the plurality of components. In an embodiment, the first set of characteristic parameters includes a line height, a word spacing, a line spacing, a number of pixels of each component, a width of each component, a height of each component, coordinates of each component, density of each component, and an aspect ratio of each component.

Once the first set of characteristic parameters are calculated, processor 1404 merges the plurality of components based on the first set of characteristic parameters. The merged components form one or more of one or more sub-words and one or more words In an embodiment, processor 1404 calculates the line height by creating a histogram of heights corresponding to a height of each of the plurality of components. A frequency occurring height from the histogram is then identified by processor 1404. Subsequently, processor 1404 computes the line height as a product of the frequently occurring height and a multiplying factor. The multiplying factor depends on the frequently occurring height. The line height may be used to segment one or more of one or more words and one or more sub-words into one or more horizontal lines of the Arabic text. Additionally, the line height is used by processor 1404 to calculate the word spacing Moving on, processor 1404 calculates the word spacing by creating a histogram of spaces between consecutive components of the plurality of components. Processor 1404 then identifies a frequently occurring space from the histogram. The frequently occurring space is identified from within a threshold range, wherein the threshold range is based on the line height. Subsequently, the word spacing is computed based on the frequently occurring space by processor 1404. The word spacing is the spacing between two consecutive words of the Arabic text.

Processor 1404 is also configured to calculate the line spacing by creating a histogram of a plurality of horizontal projections of the plurality of components. A horizontal projection indicates a number of pixels associated with the plurality of components corresponding to each sweep of the raster scan. Then, an average distance between two consecutive maximum horizontal projections is calculated by processor 1404. Subsequently, processor 1404 computes the line spacing based on the average distance.

Further, processor 1404 determines the number of pixels of each component, the width of each component, the height of each component, the coordinates of each component, the density of each component, and the aspect ratio of each component.

As specified earlier, processor 1404 merges the plurality of components based on the first set of characteristic parameters. In order to do so, processor 1404 combines the consecutive components when a spacing between the components is less than a factor of the word spacing. In addition to the word spacing, the coordinates of the consecutive components may also determine if the consecutive components are combined. Further, processor 1404 filters the components associated with the non-text items from the components associated with the Arabic text based on the first set of characteristic parameters as explained in conjunction with FIG. 8. Filtering the non-text items results in one or more of one or more sub-words and one or more words.

Processor 1404 is further configured to calculate a second set of characteristic parameters of the one or more of one or more sub-words and one or more words. The second set of characteristic parameters includes a line height, a word spacing, and a line spacing. Two or more sub-words are then grouped by processor 1404 based on the second set of characteristic parameters to form one or more of one or more sub-words and one or more words.

On forming the one or more sub-words and the one or more words, processor 1404 segments the one or more sub-words and the one or more words that overlap vertically to form a horizontal line of the Arabic text. In an embodiment, the one or more sub-words and the one or more words may also be segmented by processor 1404 based on one or more of the line height and the line spacing.

On segmenting the one or more of one or more sub-words and one or more words into one of more lines and prior to performing OCR, processor 1404 determines orientation of the image. The orientation of the image may be one of a right side up image and an upside down image. To determine the orientation, processor 1404 identifies the components having a height greater than a factor of the line height. Subsequently, a center of each line is determined by processor 1404 as the mid point between the top edge and the bottom edges of the horizontal line. On determining a center of each line, processor 1404 calculates a distance between one or more of the center and the top edge, and the center and the bottom edge. Subesequently, processor 1404 determines the orientation of the image based on the distance between one or more of the center and the top edge and the center and the bottom edge as explained in conjunction with FIG. 13.

Various embodiments of the invention provide methods and systems for preprocessing an image for OCR, wherein the image includes Arabic text and non-text items. The invention segments Arabic text into sub-words and words that can be accurately processed by an OCR system. The method also takes into consideration the accent marks and punctuation marks associated with Arabic text when determining if a component is noise or part of the Arabic text.

Those skilled in the art will realize that the above recognized advantages and other advantages described herein are merely exemplary and are not meant to be a complete rendering of all of the advantages of the various embodiments of the present invention.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method of preprocessing an image for optical character recognition (OCR), wherein the image comprises Arabic text and non-text items, the method comprising:
   determining a plurality of components associated with at least one of the Arabic text and the non-text items, wherein a component comprises a set of connected pixels;
   calculating a first set of characteristic parameters associated with the plurality of components; and
   merging the plurality of components based on the first set of characteristic parameters to form at least one of at least one sub-word and at least one word;
   calculating a second set of characteristic parameters associated with the at least one of each sub-word and each word, wherein the second set of characteristic parameters is one of a line height, a word spacing, and a line spacing;
   grouping at least two sub-words based on the second set of characteristic parameters to form one of at least one sub-word and at least one word;
   segmenting the at least one sub word and the at least one word into at least one horizontal line based on at least one of a line height and a line spacing;
   identifying at least one component associated with the at least one horizontal line comprising a height greater than a factor of the line height;
   determining a center of each horizontal line of the at least one horizontal line, wherein the center is a mid point between a top edge and a bottom edge of each horizontal line;
   calculating a distance between at least one of the center and the top edge, and the center and the bottom edge; and
   determining orientation of the image based on the distance.

2. The method of claim 1, wherein the image is obtained by converting at least one of a grayscale image and a color image into a binary image.

3. The method of claim 1, wherein the image is obtained by filtering salt and pepper noise.

4. The method of claim 1, wherein the image is obtained by correcting skew using a modified Hough transform, wherein the modified Hough transform is adapted for the Arabic text.

5. The method of claim 1, wherein determining the plurality of components comprises:
   performing a raster scan across the image;
   identifying a plurality of pixels associated with at least one of the plurality of components corresponding to at least one sweep of the raster scan; and
   aggregating the plurality of pixels based on an interconnection between the plurality of pixels to form at least one set of connected pixels.

6. The method of claim 5, wherein a pixel is interconnected with at least one of 8 neighboring pixels of the pixel.

7. The method of claim 1, wherein the first set of characteristic parameters is at least one of a line height, a word spacing, a line spacing, a number of pixels corresponding to each component, a width of each component, a height of each component, coordinates of each component, density of each component, and aspect ratio of each component.

8. The method of claim 7, wherein calculating the line height comprises:
   creating a histogram of heights corresponding to a height of each of the plurality of components;
   identifying a frequently occurring height from the histogram of heights; and
   computing line height based on the frequently occurring height.

9. The method of claim 7, wherein calculating the word spacing comprises:
   creating a histogram of spaces between consecutive components of the plurality of components;
   identifying a frequently occurring space from the histogram, wherein the frequently occurring space is within a threshold range determined by the line height; and
   computing the word spacing based on the frequently occurring space.

10. The method of claim 9, wherein the consecutive components comprise at least one of vertically overlapping components and components separated by a predefined distance, wherein the vertically overlapping components share at least one coordinate along a vertical axis.

11. The method of claim 7, wherein calculating the line spacing comprises:
   creating a histogram of a plurality of horizontal projections of the plurality of components, wherein a horizontal projection of the plurality of horizontal projections indicates a number of pixels associated with the plurality of components corresponding to each sweep of the raster scan;

calculating an average distance between two consecutive maximum horizontal projections; and computing the line spacing based on the average distance.

12. The method of claim 9, wherein merging the plurality of components comprises:

combining the consecutive components based on the word spacing; and filtering at least one component of the plurality of components associated with the non-text items from the plurality of components associated with the Arabic text based on the first set of characteristic parameters.

13. A system for preprocessing an image for optical character recognition (OCR), wherein the image comprises Arabic text and non-text items, the system comprising:

a memory; and a processor coupled to the memory, wherein the processor is configured to:

determine a plurality of components associated with at least one of the Arabic text and the non-text items, wherein a component comprises a set of connected pixels;

calculate a first set of characteristic parameters associated with the plurality of components;

merge the plurality of components based on the first set of characteristic parameters to form at least one of at least one sub-word and at least one word;

calculate a second set of characteristic parameters of the at least one of each subword and each word, wherein the second set of characteristic parameters is one of a line height, a word spacing, and a line spacing;

group at least two sub-words based on the second set of characteristic parameters to form one of at least one sub-word and at least one word;

segment the at least one sub word and the at least one word into at least one horizontal line based on at least one of a line height and a line spacing;

identify at least one component associated with the at least one horizontal line comprising a height greater than a factor of the line height;

determine a center of each horizontal line of the at least one horizontal line, wherein the center is a mid point between a top edge and a bottom edge of each horizontal line;

calculate a distance between at least one of the center and the top edge, and the center and the bottom edge; and determine orientation of the image based on the distance.

14. The system of claim 13, wherein the processor is further configured to perform at least one of:

converting at least one of a grayscale image and a color image into a binary Image;

filtering salt and pepper noise; and correcting skew using a modified Hough transform.

15. The system of claim 13, wherein for determining the plurality of components the processor is further configured to:

perform a raster scan across the image;

identify a plurality of pixels associated with at least one of the plurality of components corresponding to at least one sweep of the raster scan; and aggregate the plurality of pixels based on an interconnection between the plurality of pixels to form at least one set of connected pixels.

16. The system of claim 13, wherein the first set of characteristic parameters is at least one of a line height, a word spacing, a line spacing, a number of pixels corresponding to each component, a width of each component, a height of each component, coordinates of each component, density of each component, and the aspect ratio of each component.

17. The system of claim 16, wherein for calculating the line height the processor is further configured to:

create a histogram of heights corresponding to a height of each of the plurality of components;

identify a frequently occurring height from the histogram of heights; and compute line height based on the frequently occurring height.

18. The system of claim 16, wherein for calculating the word spacing the processor is further configured to:

create a histogram of spaces between consecutive components of the plurality of components;

identify a frequently occurring space from the histogram, wherein the frequently occurring space is within a threshold range determined by the line height; and computing the word spacing based on the frequently occurring space.

19. The system of claim 18, wherein the processor is further configured to:

combine the consecutive components based on the word spacing to form at least one of the at least sub-word and the at least one word; and filter at least one component of the plurality of components associated with the non-text items from the plurality of components associated with the Arabic text based on the first set of characteristic parameters.

20. The system of claim 16, wherein for calculating the line spacing the processor is further configured to:

create a histogram of a plurality of horizontal projections of the plurality of components, wherein a horizontal projection of the plurality of horizontal projections indicates a number of pixels associated with the plurality of components corresponding to each sweep of the raster scan;

calculate an average distance between two consecutive maximum horizontal projections; and compute the line spacing based on the average distance.

* * * * *